(12) United States Patent
Zhang

(10) Patent No.: US 11,319,219 B2
(45) Date of Patent: May 3, 2022

(54) SPRINKLER

(71) Applicant: Cixi Storm Showers Co., Ltd., Ningbo Zhejiang Province (CN)

(72) Inventor: Jinwei Zhang, Ningbo (CN)

(73) Assignee: Cixi Storm Showers Co., Ltd., Ningbo Zhejiang Province (CN)

(*) Notice: Subject to any disclaimer, the term of this patent is extended or adjusted under 35 U.S.C. 154(b) by 398 days.

(21) Appl. No.: 16/395,269

(22) Filed: Apr. 26, 2019

(65) Prior Publication Data

US 2020/0239331 A1 Jul. 30, 2020

(30) Foreign Application Priority Data

Jan. 26, 2019 (CN) .......................... 201920135185.5
Jan. 26, 2019 (CN) .......................... 201920135191.0

(51) Int. Cl.
*C02F 1/28* (2006.01)
*B05B 1/18* (2006.01)
*B01D 39/06* (2006.01)
*C02F 1/00* (2006.01)

(52) U.S. Cl.
CPC .............. *C02F 1/283* (2013.01); *B01D 39/06* (2013.01); *B05B 1/18* (2013.01); *C02F 1/003* (2013.01); *C02F 2307/06* (2013.01)

(58) Field of Classification Search
CPC .... B01D 2239/0407; B01D 2239/0654; B01D 39/06; B01D 39/10; B01D 39/1623; B05B 12/002; B05B 1/1636; B05B 1/169; B05B 1/18; B05B 1/3026; C02F 1/003; C02F 1/281; C02F 1/283; C02F 1/42; C02F 2307/06

See application file for complete search history.

(56) References Cited

U.S. PATENT DOCUMENTS

| | | | |
|---|---|---|---|
| 7,143,897 B1 * | 12/2006 | Guzman | ................ B01D 35/04 210/460 |
| 2002/0113145 A1 * | 8/2002 | Wong | ..................... B05B 15/40 239/446 |
| 2005/0224406 A1 * | 10/2005 | Takagi | ................... B05B 15/40 210/424 |

* cited by examiner

*Primary Examiner* — Dirk R Bass
(74) *Attorney, Agent, or Firm* — Gang Yu

(57) ABSTRACT

A sprinkler includes a sprinkler head and a handle, the sprinkler head is connected with the handle and is arranged to penetrate through the inside of the handle, a water inlet connected with an external water pipe is formed on a tail portion of the handle, a sprinkling surface is disposed on a front end surface of the sprinkler head, a plurality of water outlets are formed on the sprinkling surface, a first filter screen and a second filter screen are further disposed in the sprinkler head, the first filter screen is close to the water outlets, and a filter material or filter cotton for filtering is disposed between the first filter screen and the second filter screen.

13 Claims, 3 Drawing Sheets

SPRINKLER

TECHNICAL FIELD

The present disclosure relates to a sprinkler.

BACKGROUND

A sprinkler is a shower tool very commonly used in life. In the existing shower tool, the size of the water yield often only can be adjusted by an external switch, and the local water yield on a sprinkler head cannot be adjusted. Moreover, a sprinkler capable of yielding water locally is adjusted by rotating generally, and in the rotational adjustment process, because of threaded connection, a screw thread is loosened frequently to affect the use of a customer.

Furthermore, for a majority of existing sprinklers, the diameters of holes are large, so that the water yielding force is small and thus the sprinkling effect of the shower cannot be implemented.

Meanwhile, the existing sprinklers are basically common and only take a water flow guiding effect. The yielding water is running water fundamentally. The running water contains much dirt and a chlorine component, and in case of a long-term contact, the phenomena such as dry skin and inappetence will be caused.

SUMMARY

In order to overcome the above-mentioned defects of the conventional art, the present disclosure provides a sprinkler, which not only has a good filter function, but also can adjust a water yielding manner of the sprinkler and does not occur a part loosening and falling phenomenon in use.

The technical solutions provided by the present disclosure to solve the technical problems are as follows: a sprinkler includes a sprinkler head and a handle, the sprinkler head is connected with the handle and communicated with an inside of the handle, a water inlet connected with an external water pipe is formed on a tail portion of the handle, a sprinkling surface is disposed on a front end surface of the sprinkler head, a plurality of water outlets are formed on the sprinkling surface, water of the external water pipe enters from the water inlet and is sprinkled out from the plurality of water outlets, wherein a first filter screen and a second filter screen are further disposed in the sprinkler head, the first filter screen is close to the plurality of water outlets, and a filter material or filter cotton for filtering is disposed between the first filter screen and the second filter screen.

In some embodiments, a first insertion port is formed on the first filter screen, a second insertion port is formed on the second filter screen, and the first insertion port is inserted into the second insertion port.

In some embodiments, a fixing ring for fixing the sprinkling surface is further disposed on a front end of the sprinkler head, and the fixing ring is disposed detachably.

In some embodiments, a switch is further disposed on the sprinkler head.

In some embodiments, the sprinkler head is fixed with the switch by ultrasonic welding.

In some embodiments, a cylindrical filter element is further disposed in the handle, and an internal filter material of the filter element is an active carbon or a Polypropylene (PP) cotton or the filter material.

In some embodiments, the filter material includes a Kinetic Degradation Fluxion (KDF), a calcium nitrite, a granular active carbon, a negative ion sphere, and a spice.

In some embodiments, a water yielding seat and a gear adjustment ring are further disposed on the sprinkler head, the gear adjustment ring is disposed on the water yielding seat in a sleeving manner, at least three passage holes are formed on the water yielding seat, an output end of each passage hole communicates with a different water yielding channel, and the gear adjustment ring rotationally drives the water yielding seat to rotate, so that any one of the at least three passage holes communicates with a water channel inside the sprinkler and at last the water in the internal water channel is flowed out from the different water yielding channels by the at least three passage holes.

In some embodiments, a first limit rib is disposed on the water yielding seat, a second limit rib is disposed on the gear adjustment ring, and the first limit rib is interfered with the second limit rib so that the gear adjustment ring rotationally drives the water yielding seat to rotate.

In some embodiments, the at least three passage holes include a first passage hole, a second passage hole and a third passage hole, the first passage hole is located at a middle position of the water yielding seat, and, the second passage hole and the third passage hole are close to the first passage hole.

In some embodiments, the second passage hole is connected to an external ring water yielding channel, the third passage hole is connected to an internal ring water yielding channel, and the first passage hole is connected to the external ring water yielding channel and the internal ring water yielding channel.

In some embodiments, an annular lug boss is disposed on the water yielding seat, a first water yielding area is formed in the annular lug boss, the annular lug boss and an inner wall of the water yielding seat are formed into a second water yielding area, and the first filter screen and the second filter screen both are clamped in the first water yielding area and the second water yielding area.

The present disclosure has the following beneficial effects: 1, with multi-layer filtration of the filter screens, the filter material and the filter element, the running water is effectively dechlorinated; and moreover, the dirty impurities in the running water are filtered to improve the cleanliness in the shower; 2, the fixing ring is disposed detachably, so the sprinkling surface, may be taken by people easily for cleaning and thus the maintenance is convenient; 3, the disconnection and connection of the water in the sprinkler head can be controlled by the switch, thereby being very convenient to use; 4, the sprinkler head is fixed with the switch by the ultrasonic welding, so the fixing strength and the sealing property are good, and the condition where the water quality is polluted by a metal is not occurred; 5, with the gear adjustment ring and the water yielding seat, different water yielding manners are implemented and the requirement of the customer is met, and furthermore, the structure is simple and the gear adjustment ring and the water yielding seat are firmly combined, so the phenomenon of falling or infirm cooperation in use is not occurred; and 6, by virtue of the three passage holes, different water yielding effects such as external ring water yielding, internal ring water yielding and overall water yielding are implemented, and the use requirements of different people are met.

DETAILED DESCRIPTION OF THE EMBODIMENTS

The present disclosure will be further described below in detail in combination with accompanying drawings and specific implementation manners.

Figure 1:
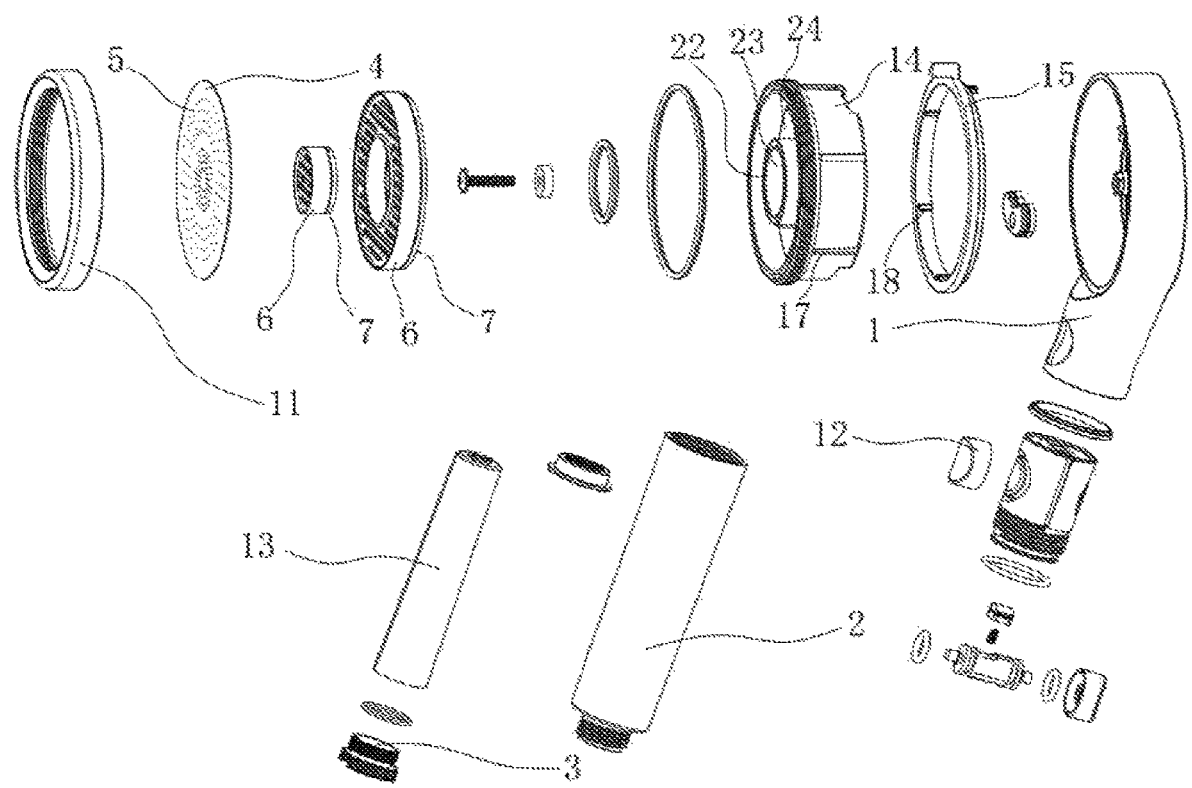
FIG. 1 is an exploded view of the present disclosure.
Figure 2:
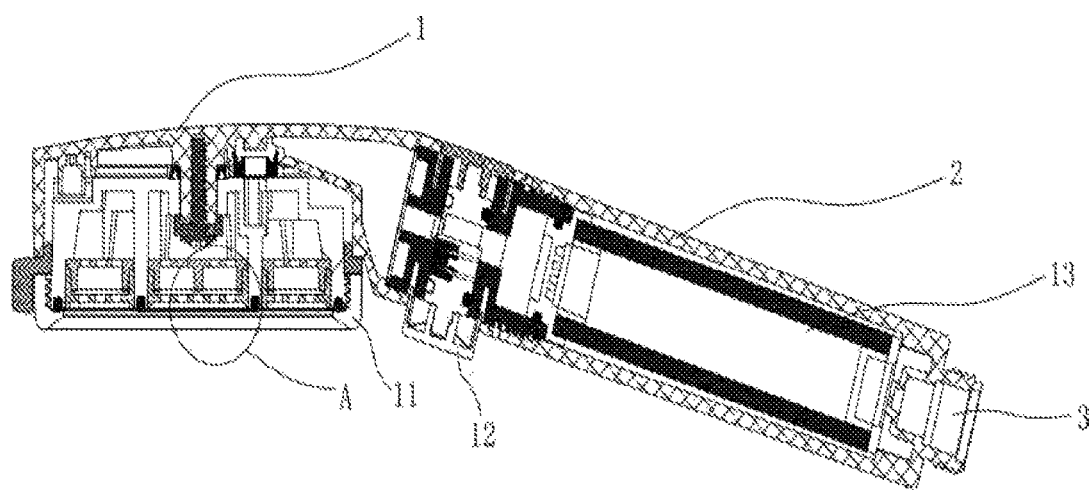
FIG. 2 is a semi-sectional view of the present disclosure.
Figure 3:
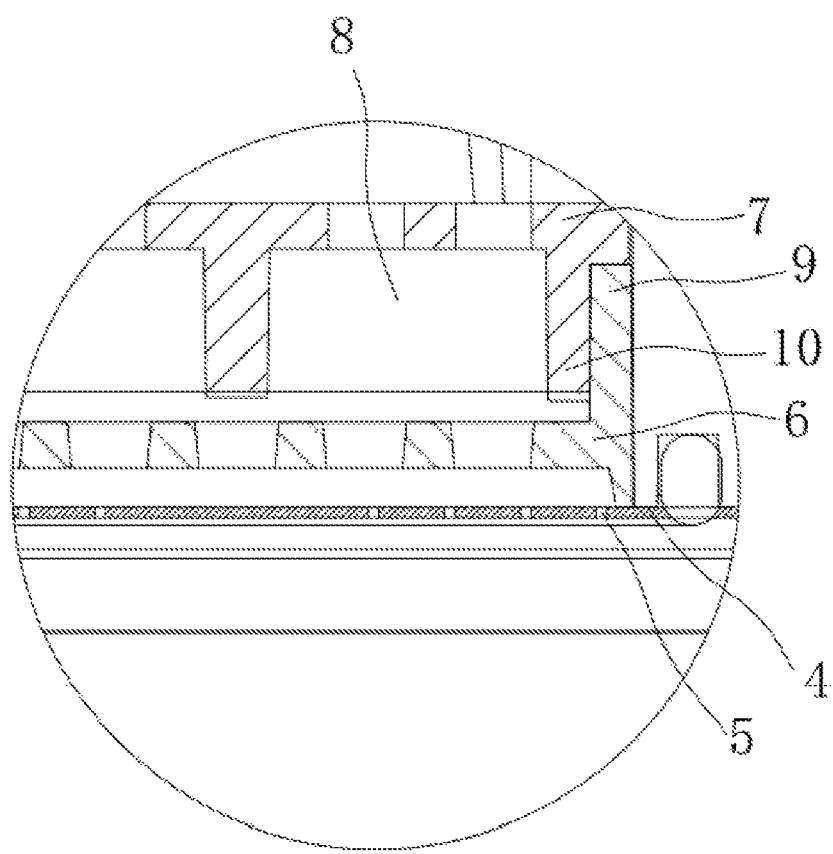
FIG. 3 is an enlarged diagram of A in FIG. 2 of the present disclosure.
Figure 4:
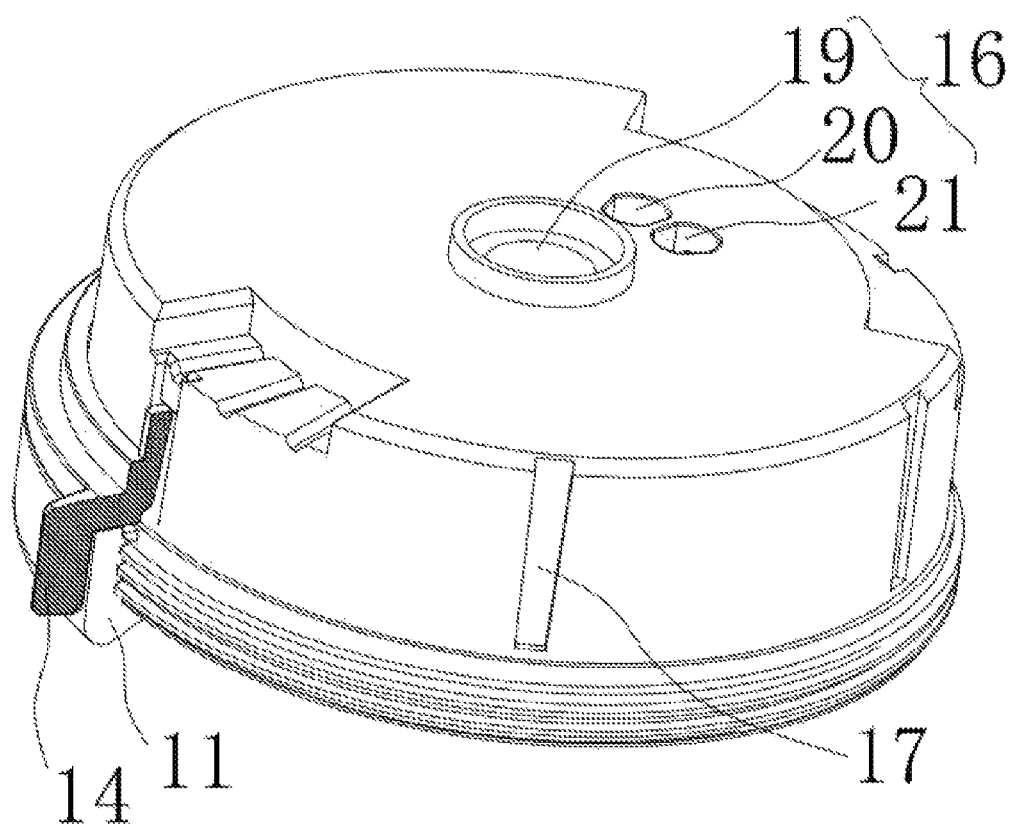
FIG. 4 is a structural diagram of a water yielding seat of the present disclosure.
Figure 5:
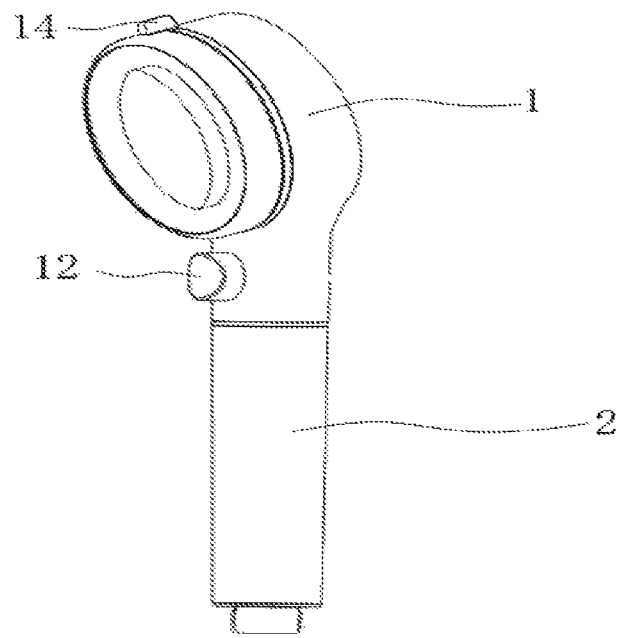
FIG. 5 is an overall external view, of the present disclosure.

Referring to FIG. 1 to FIG. 5, a sprinkler includes a sprinkler head 1 and a handle 2, the sprinkler head 1 is connected with the handle 2 and is communicated with an inside of the handle, a water inlet 3 connected with an external water pipe is formed on a tail portion of the handle 2, a sprinkling surface 4 is disposed on a front end surface of the sprinkler head 1, a plurality of water outlets 5 are formed on the sprinkling surface 4, water of the external water pipe enters from the water inlet 3 and is sprinkled out from the plurality of water outlets 5, a first filter screen 6 and a second filter screen 7 are further disposed in the sprinkler head 1, the first filter screen 6 is close to the plurality of water outlets 5, and a filter material 8 or filter cotton for filtering is disposed between the first filter screen 6 and the second filter screen 7.

In this embodiment, a first insertion port 9 is formed on the first filter screen 6, a second insertion port 10 is formed on the second filter screen 7, and the first insertion port 9 is inserted into the second insertion port 10. With the abovementioned insertion structures, the two filter screens are cooperated tightly and are detached conveniently, thereby being convenient to take and place the filter material.

In this embodiment, a fixing ring 11 for fixing the sprinkling surface 4 is further disposed on a front end of the sprinkler head 1, and the fixing ring 11 is disposed detachably. Because the fixing ring 11 is disposed detachably, the sprinkling surface may be taken by people easily for cleaning and thus the maintenance is convenient.

In this embodiment, a switch 12 is further disposed on the sprinkler head 1. Whether the sprinkler yields the water or not may be implemented by the switch 12. When the switch is pressed internally, the switch will cut off the flowing of the water inside, thus being convenient for people in use.

In this embodiment, the sprinkler head 1 is fixed with the switch 12 by ultrasonic welding. By fixing by the ultrasonic welding, the fixing strength and the sealing property are good, and the condition where the water quality is polluted by a metal is not occurred.

In this embodiment, a cylindrical filter element 13 is further disposed in the handle 2. By enabling the filter element 13 to filter the water entered from the outside, a multi-layer filtration system is formed with the filter screens and the filter material, so that the filter effectiveness is greatly improved. Moreover, an internal filter material of the filter element is an active carbon or a PP cotton or the filter material. The active carbon, the PP cotton and the filter material all have a good filtering effect. When the internal filter material of the filter element is the PP cotton and the active carbon, the water inlet is generally disposed at a side of the handle. When the internal filter material of the filter element is the filter material, the water inlet is generally disposed at a bottom of the handle.

In this embodiment, the filter material includes a KDF, a calcium nitrite, a granular active carbon, a negative ion sphere, a spice and the like. With multiple filter components, the dechloridation effect for the running water can be taken, and the impurities, heavy metals, rust, microbes and the like in the running water are removed, and the effects of activating the water and increasing the fragrance can be taken.

In this embodiment, a water yielding seat 14 and a gear adjustment ring 15 are further disposed on the sprinkler head 1, the gear adjustment ring 15 is disposed on the water yielding seat 14 in a sleeving manner, at least three passage holes 16 are formed on the water yielding seat 14, an output end of each one of the at least three passage holes 16 communicates with a different water yielding channel, and the gear adjustment ring 15 rotationally drives the water yielding seat 14 to rotate, so that any one of the at least three passage holes 16 communicates with a water channel inside the sprinkler and at last the water in the internal water channel is flowed out from the different water yielding channels by the at least three passage holes 16. With the above structure, the water may be sprinkled out from the different water yielding channels when different gears are adjusted, and at last the different water yielding effects are implemented.

In this embodiment, a first limit rib 17 is disposed on the water yielding seat 14, a second limit rib 18 is disposed on the gear adjustment ring 15, and the first limit rib 17 is interfered with the second limit rib 18 so that the gear adjustment ring 15 rotationally drives the water yielding seat 14 to rotate. Interference structures of the limit ribs are designed skillfully, so the rigid damage is not occurred; and in use, the gear adjustment ring 15 only needs to be pushed slightly.

In this embodiment, the passage holes 16 include a first passage hole 19, a second passage hole 20 and a third passage hole 21, the first passage hole 19 is located at a middle position of the water yielding seat 14, and the second passage hole 20 and the third passage hole 21 are close to the first passage hole 19. In view of the flexibility and convenience of gear shift, the positions of the passage holes are disposed as above. Each passage hole (i.e., gear position) is very close, so that a far distance does not need to be pushed, or a large force does not need to be used in use; and therefore, the use is very convenient.

In this embodiment, the second passage hole 20 is connected to an external ring water yielding channel, the third passage hole 21 is connected to an internal ring water yielding channel, and the first passage hole 19 is connected to the external ring water yielding channel and the internal ring water yielding channel. When the gear is shifted to the second passage hole 20, the sprinkler yields the water from the external ring. When the gear is shifted to the third passage hole 21, the water is yielded from the internal ring. When the gear is shifted to the first passage hole 19, the sprinkler yields the water overall. Therefore, different water yielding manners are implemented. Certainly, the water yielding manner may also be a left half water yielding manner, a right half water yielding manner and an overall water yielding manner, or other water yielding manner.

In this embodiment, an annular lug boss 22 is disposed on the water yielding seat 14, a first water yielding area 23 is formed in the annular lug boss 22, the annular lug boss 22 and an inner wall of the water yielding seat 14 are formed into a second water yielding area 24, and the first filter screen 6 and the second filter screen 7 both are clamped in the first water yielding area 23 and the second water yielding area 24. With the above structure, the first filter screen 6 and the second filter screen 7 can be fixed firmly and are prevented from shaking to affect the filtering effect; and moreover, the first filter screen 6 and the second filter screen 7 can take the very good filtering effect and thus are rightly disposed at the water yielding positions, i.e., the first water yielding area 23 and the second water yielding area 24 of the water yielding seat 14.

What is claimed is:

1. A sprinkler, comprising a sprinkler head and a handle, wherein the sprinkler head is connected with the handle and is communicated with an inside of the handle, a water inlet connected with an external water pipe is formed on a tail portion of the handle, a sprinkling surface is disposed on a front end surface of the sprinkler head, a plurality of water outlets are formed on the sprinkling surface, water of the external water pipe enters from the water inlet and is sprinkled out from the plurality of water outlets, wherein a first filter screen and a second filter screen are further disposed in the sprinkler head, the first filter screen is close to the plurality of water outlets, and a filter material or filter cotton for filtering is disposed between the first filter screen and the second filter screen, the filter material comprises a Kinetic Degradation Fluxion (KDF), a calcium nitrite, a granular active carbon, a negative ion sphere, and a spice.

2. The sprinkler as claimed in claim 1, wherein a first insertion port is formed on the first filter screen, a second insertion port is formed on the second filter screen, and the first insertion port is inserted into the second insertion port.

3. The sprinkler as claimed in claim 1, wherein a fixing ring for fixing the sprinkling surface is further disposed on a front end of the sprinkler head, and the fixing ring is disposed detachably.

4. The sprinkler as claimed in claim 1, wherein a cylindrical filter element is further disposed in the handle, and an internal filter material of the filter element is an active carbon or a Polypropylene (PP) cotton.

5. The sprinkler as claimed in claim 1, wherein a water yielding seat and a gear adjustment ring are further disposed on the sprinkler head, the gear adjustment ring is disposed on the water yielding seat in a sleeving manner, at least three passage holes are formed on the water yielding seat, an output end of each passage hole communicates with a different water yielding channel, and the gear adjustment ring rotationally drives the water yielding seat to rotate, so that any one of the at least three passage holes communicates with a water channel inside the sprinkler and water in the water channel inside the sprinkler is finally flowed out from the different water yielding channels by the at least three passage holes.

6. The sprinkler as claimed in claim 5, wherein a first limit rib is disposed on the water yielding seat, a second limit rib is disposed on the gear adjustment ring, and the first limit rib is interfered with the second limit rib so that the gear adjustment ring rotationally drives the water yielding seat to rotate.

7. The sprinkler as claimed in claim 5, wherein the at least three passage holes comprise a first passage hole, a second passage hole and a third passage hole, the first passage hole is located at a middle position of the water yielding seat, and the second passage hole and the third passage hole are close to the first passage hole.

8. The sprinkler as claimed in claim 7, wherein the second passage hole is connected to an external ring water yielding channel, the third passage hole is connected to an internal ring water yielding channel, and the first passage hole is connected to the external ring water yielding channel and the internal ring water yielding channel.

9. The sprinkler as claimed in claim 5, wherein an annular lug boss is disposed on the water yielding seat, a first water yielding area is formed in the annular lug boss, the annular lug boss and an inner wall of the water yielding seat are formed into a second water yielding area, and the first filter screen and the second filter screen both are clamped in the first water yielding area and the second water yielding area.

10. A sprinkler, comprising a sprinkler head and a handle, wherein the sprinkler head is connected with the handle and is communicated with an inside of the handle, a water inlet connected with an external water pipe is formed on a tail portion of the handle, a sprinkling surface is disposed on a front end surface of the sprinkler head, a plurality of water outlets are formed on the sprinkling surface, water of the external water pipe enters from the water inlet and is sprinkled out from the plurality of water outlets, wherein a first filter screen and a second filter screen are further disposed in the sprinkler head, the first filter screen is close to the plurality of water outlets, and a filter material or filter cotton for filtering is disposed between the first filter screen and the second filter screen;

wherein a water yielding seat and a gear adjustment ring are further disposed on the sprinkler head, the gear adjustment ring is disposed on the water yielding seat in a sleeving manner, at least three passage holes are formed on the water yielding seat, an output end of each passage hole communicates with a different water yielding channel, and the gear adjustment ring rotationally drives the water yielding seat to rotate, so that any one of the at least three passage holes communicates with a water channel inside the sprinkler and water in the water channel inside the sprinkler is finally flowed out from the different water yielding channels by the at least three passage holes;

wherein a first limit rib is disposed on the water yielding seat, a second limit rib is disposed on the gear adjustment ring, and the first limit rib is interfered with the second limit rib so that the gear adjustment ring rotationally drives the water yielding seat to rotate.

11. The sprinkler as claimed in claim 10, wherein the at least three passage holes comprise a first passage hole, a second passage hole and a third passage hole, the first passage hole is located at a middle position of the water yielding seat, and the second passage hole and the third passage hole are close to the first passage hole.

12. The sprinkler as claimed in claim 11, wherein the second passage hole is connected to an external ring water yielding channel, the third passage hole is connected to an internal ring water yielding channel, and the first passage hole is connected to the external ring water yielding channel and the internal ring water yielding channel.

13. The sprinkler as claimed in claim 10, wherein an annular lug boss is disposed on the water yielding seat, a first water yielding area is formed in the annular lug boss, the annular lug boss and an inner wall of the water yielding seat are formed into a second water yielding area, and the first filter screen and the second filter screen both are clamped in the first water yielding area and the second water yielding area.

\* \* \* \* \*